(12) United States Patent
Fukui

(10) Patent No.: US 7,073,438 B2
(45) Date of Patent: Jul. 11, 2006

(54) IMAGE FORMING APPARATUS INCLUDING ROTARY DRUM AND DETACHABLY MOUNTED CHUCK

(75) Inventor: Takashi Fukui, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 1072 days.

(21) Appl. No.: 10/073,906

(22) Filed: Feb. 14, 2002

(65) Prior Publication Data

US 2002/0154286 A1    Oct. 24, 2002

(30) Foreign Application Priority Data

Feb. 19, 2001   (JP) ............................... 2001-041637

(51) Int. Cl.
G03F 7/24 (2006.01)
B41F 21/00 (2006.01)

(52) U.S. Cl. .................... 101/409; 101/415.1; 271/277

(58) Field of Classification Search ................ 101/409, 101/410, 415.1, 378, 477; 271/275, 277, 271/82; 355/75, 85, 110; 346/134

See application file for complete search history.

(56) References Cited

U.S. PATENT DOCUMENTS 6,164,204 A * 12/2000 Kawada et al. .......... 101/415.1
6,736,396 B1 * 5/2004 Fukui .......................... 271/275
6,856,334 B1 * 2/2005 Fukui .......................... 346/138

* cited by examiner

Primary Examiner—Leslie J. Evanisko
(74) Attorney, Agent, or Firm—Sughrue Mion, PLLC

(57) ABSTRACT

A fixing structure comprises a rotary drum having an outer peripheral surface, around which a printing plate is wound, and an inner peripheral surface portion, the drum including through-slots formed in the outer surface at predetermined intervals in the peripheral direction, each of which communicates the outer surface with the inner surface portion; and a chuck detachably mountable to the drum, for clamping one end of the printing plate onto the drum, the chuck including a support having opposite ends, a clamp plate provided on one support end, and a base section provided on the other support end, wherein when the chuck is mounted on the drum, the base section is inserted and passed through one associated through-slot and then hooked over the inner surface portion.

20 Claims, 9 Drawing Sheets

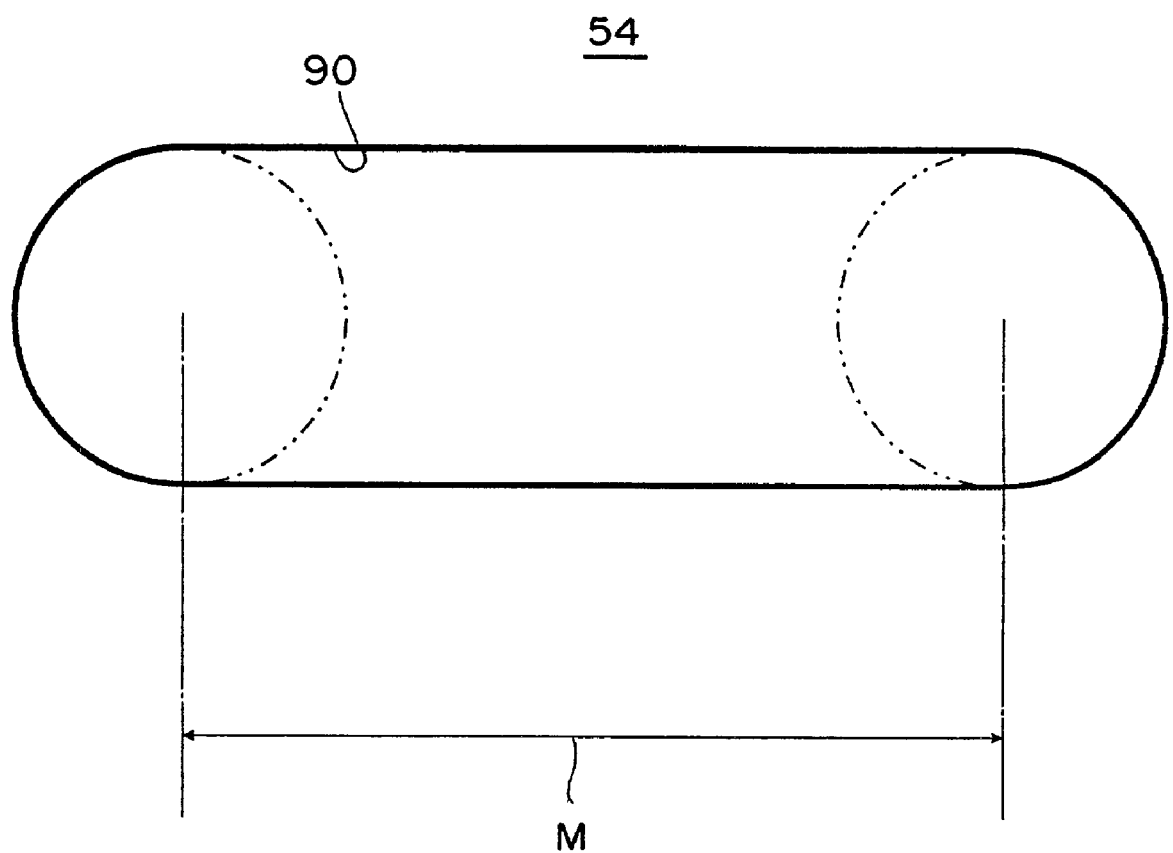

US 7,073,438 B2

IMAGE FORMING APPARATUS INCLUDING ROTARY DRUM AND DETACHABLY MOUNTED CHUCK

BACKGROUND OF THE INVENTION

1. Field of the Invention

The present invention relates to an apparatus for detachably fixing a sheet member onto a rotor such as a rotary drum, and to an image forming apparatus incorporating the former.

2. Description of the Related Art

Generally, a photosensitive printing plate (hereinafter, "printing plate"), comprising a sheet-like support (e.g., a thin aluminum plate) having disposed thereon a photosensitive layer, is used for printing. Printing plates having different vertical and horizontal dimensions are used depending upon the size of the item to be printed.

An image exposure apparatus that image-exposes the printing plate includes a device for winding the printing plate around a rotary drum and irradiating the printing plate with a light beam corresponding to image data while the printing plate is rotated integrally with the rotary drum, whereby the printing plate is scan-exposed.

When the printing plate is wound around the rotary drum, the printing plate is nipped and fixed to the rotary drum by holding devices (chucks). The holding devices clamp ends of the printing plate along the circumferential direction of the rotary drum to thereby fix the ends between the chucks and the peripheral surface of the rotary drum.

Namely, a holding device corresponding to one end (e.g., a leading edge in the direction in which the printing plate is wound) of the printing plate along the circumferential direction of the rotary drum is attached at a predetermined position on the rotary drum. After the printing plate has been wound around the rotary drum, a holding device corresponding to the other end (i.e., a trailing edge) of the printing plate is attached at a position according to the size of the printing plate.

The holding device for attaching the printing plate to the rotary drum at the position according to the size has a fixing barrel (stanchion) which can be inserted into an arbitrary position of an attachment groove that is formed along the peripheral direction in the peripheral surface of the rotary drum. The fixing barrel is freely movable relative to the attachment groove, whereby the ends of printing plates having various sizes can be nipped in suitable positions. The attachment groove for housing the fixing barrel has a transverse cross section that can be quite complicated.

However, this type of rotary drum necessarily holds considerably large, solid portions in which such grooves can be formed. This means that the rotary drum inevitably becomes large and heavy, which poses an obstacle to high-speed rotation of the rotary drum.

SUMMARY OF THE INVENTION

In light of the above-mentioned fact, according to one aspect of the present invention, there is provided a fixing structure for detachably fixing a sheet member, comprising: a rotor having an outer peripheral surface, around which the sheet member is wound, and an inner peripheral surface portion, the rotor including a plurality of through-slots formed in the outer peripheral surface of the rotor at predetermined intervals in the peripheral direction, with each of the through-slots being elongated in the peripheral direction and communicating the outer peripheral surface with the inner peripheral surface portion; and a chuck detachably mountable to the rotor, for clamping one end of the sheet member onto the rotor, the chuck including a support having opposite ends, with a clamp plate being disposed at one end of the support and a base section being disposed at the other end of the support, wherein when the chuck is mounted on the rotor, the base section is inserted and passed through one associated through-slot and then hooked over the inner peripheral surface portion.

In accordance with another aspect of the present invention, there is provided an apparatus for forming an image on a printing plate, comprising: a rotary drum having an outer peripheral surface, around which the printing plate is wound, and an inner peripheral surface portion, the rotary drum including a plurality of through-slots formed in the outer peripheral surface of the rotary drum at predetermined intervals in the peripheral direction, with each of the through-slots being elongated in the peripheral direction and communicating the outer peripheral surface with the inner peripheral surface portion; a chuck detachably mountable to the rotary drum, for clamping one end of the printing plate onto the rotary drum, the chuck including a support having opposite ends, with a clamp plate being disposed at one end of the support and a base section being disposed at the other end of the support, wherein when the chuck is mounted on the rotary drum, the base section is inserted and passed through one associated through-slot and then hooked over the inner peripheral surface portion; and a recording head disposed for recording an image on the printing plate wound on the rotary drum.

The foregoing and other objects, features and advantages of the present invention will be apparent from the following description of a preferred embodiment of the invention, as illustrated in the accompanying drawings.

BRIEF DESCRIPTION OF THE DRAWINGS

FIG. 9 is an enlarged plan view of a through-slot.

DESCRIPTION OF THE PREFERRED EMBODIMENT

Figure 1:
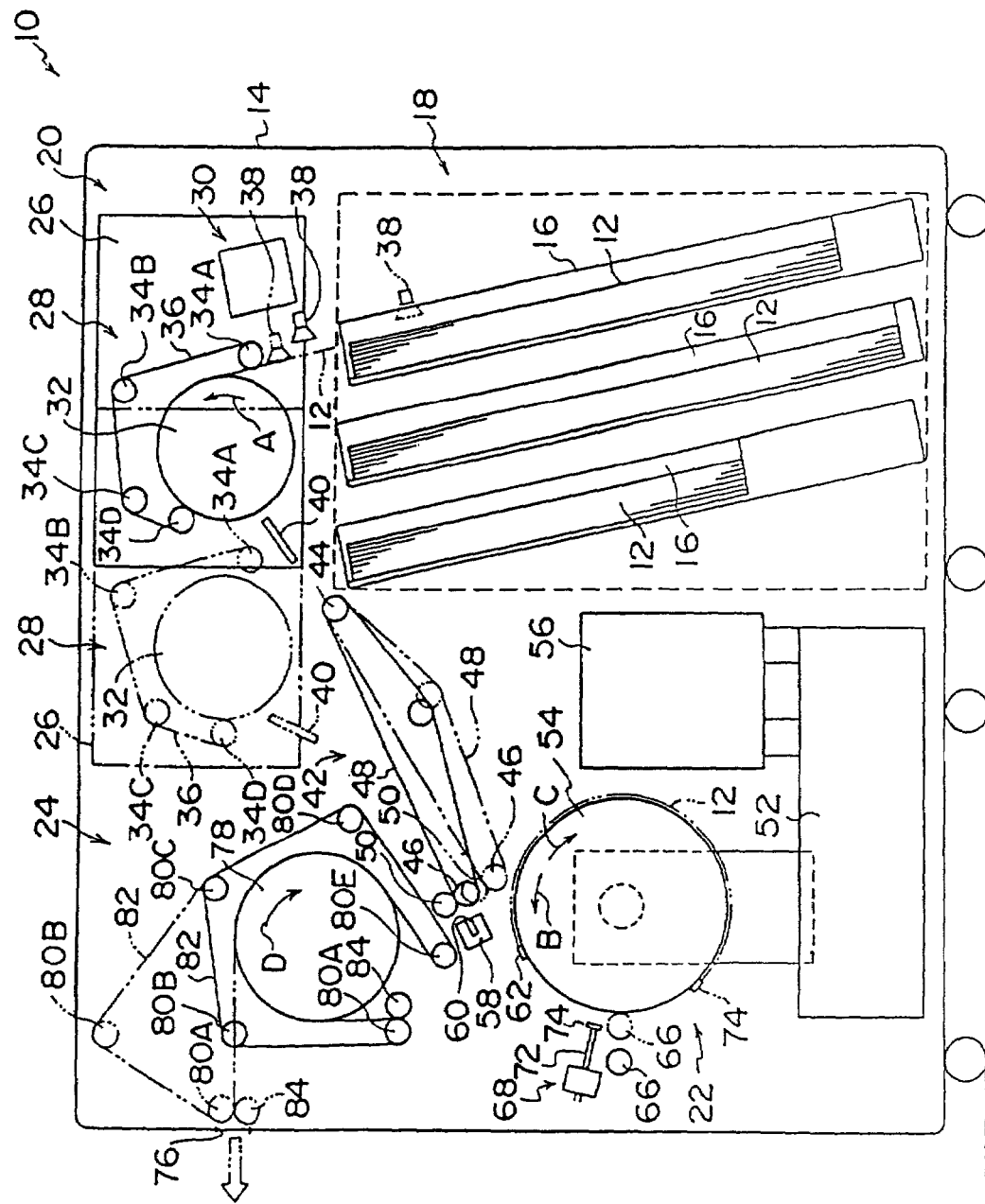
FIG. 1 is a general view showing a schematic structure of an image exposure apparatus according to an embodiment of the present invention.

Referring now to the accompanying drawings, an embodiment of the present invention will be described below. FIG. 1 illustrates a schematic structure of an image exposure apparatus 10 according to the present embodiment. The image exposure apparatus 10 irradiates a sheet member (hereinafter, "printing plate 12") with a light beam modulated on the basis of image data to thereby scan-expose the printing plate 12. The printing plate 12 is a photosensitive planographic printing plate comprising a thin, rectangular plate-like support (e.g., aluminum) having disposed thereon a photosensitive layer. After the printing plate 12 is image-exposed in the image exposure apparatus 10, the printing plate 12 is developed and processed by an automatic developing apparatus (not illustrated).

The image exposure apparatus 10 is disposed with a machine casing 14 having therein a cassette loading section 18, a plate conveying section 20, a recording section 22, and a discharge buffer section 24. The cassette loading section 18 is disposed at the lower right side of the machine casing 14 in FIG. 1. Cassettes 16, which each house a number of the printing plates 12, are disposed within the cassette loading section 18 and inclined at a predetermined angle.

The image exposure apparatus 10 can process different sizes (i.e., having different lengths and different widths) of the printing plates 12. Each printing plate 12 is accommodated within the cassettes 16 so that the photosensitive layer faces upward and an end of the printing plate 12 is disposed at a predetermined position. The cassettes 16 are loaded at predetermined intervals in the cassette loading section 18 so that upper ends of the printing plates 12 housed in each cassette 16 reach substantially the same height.

The plate conveying section 20 is disposed above the cassette loading section 18, and the recording section 22 is disposed at a lower, central region of the apparatus, adjacent to the cassette loading section 18. The plate conveying section 20 is disposed with a pair of side plates 26 (only one is shown in FIG. 1), and a reversal unit 28 and a sheet feeding unit 30 are mounted to the side plates 26.

The reversal unit 28 includes a reverse roller 32 having a predetermined outer diameter, and a plurality of small rollers (e.g., four small rollers 34A, 34B, 34C, and 34D in the present embodiment) is disposed around the periphery of the reverse roller 32. The small rollers 34A to 34D are positioned above the reverse roller 32, from the cassette loading section 18 side to the recording section 22 side. An endless conveyor belt 36 is entrained around the small rollers 34A to 34D, with the conveyor belt 36 extending to roughly half the circumference of the reverse roller 32 between the small roller 34A and the small roller 34D.

The sheet-feeding unit 30 has a plurality of suction cups 38 that suck upper ends of the printing plates 12 in the cassettes 16. The suction cups 38 are moved downward to oppose and suck the upper end of the printing plate 12, whereby the printing plate 12 is pulled out from the cassette 16 and the leading edge of the extracted printing plate 12 is inserted between the reverse roller 32 and the conveyor belt 36. In FIG. 1, two-dotted chain lines schematically show the positions to which the suction cups 38 move.

The reverse roller 32 and the conveyor belt 36 rotate in the direction that the printing plate 12 is pulled out from the cassette 16 (i.e., the direction of arrow A in FIG. 1). The printing plate 12 is therefore nipped between the reverse roller 32 and the conveyor belt 36, pulled out from the cassette 16, wound around the periphery of the reverse roller 32 and conveyed and reversed while being curved. The radius of the reverse roller 32 is of a value (e.g., no less than 100 mm) such that the printing plate 12 is not folded or creased when the printing plate 12 is curved.

As shown by solid lines and two-dotted chain lines in FIG. 1, the side plates 26 move horizontally in accordance with the position of the cassette 16 from which the printing plate 12 is extracted. The suction cups 38 of the sheet feeding unit 30 face the printing plate 12 in the selected cassette 16.

The side plate 26 is disposed with a guide 40 below the small roller 34D. The printing plate 12 reversed by the reverse roller 32 is fed toward the guide 40 out from between the reverse roller 32 and the conveyor belt 36 at the small roller 34D side. A conveyer 42 is disposed above the recording section 22, and the printing plate 12 fed from the reversal unit 28 is guided by the guide 40 to the conveyer 42.

The guide 40 swings in accompaniment with the movement of the side plate 26 so that the printing plate 12 is always guided toward the conveyer 42. The small roller 34D moves in accompaniment with the movement of the side plates 26, to thereby change the direction in which the printing plate 12 is fed from the reversal unit 28. The small roller 34C moves so that a substantially constant tension is imparted to the conveyor belt 36 when the small roller 34D moves. Accordingly, the printing plate 12 fed from the reversal unit 28 is gently curved by the guide 40.

In the conveyer 42, a conveyor belt 48 is entrained between a roller 44, which is disposed adjacent to the lower part of the plate conveying section 20, and a roller 46, which is disposed adjacent to the upper part of the recording section 22. The conveyer 42 is slanted such that the roller 46 is disposed lower than the roller 44.

Figure 2:
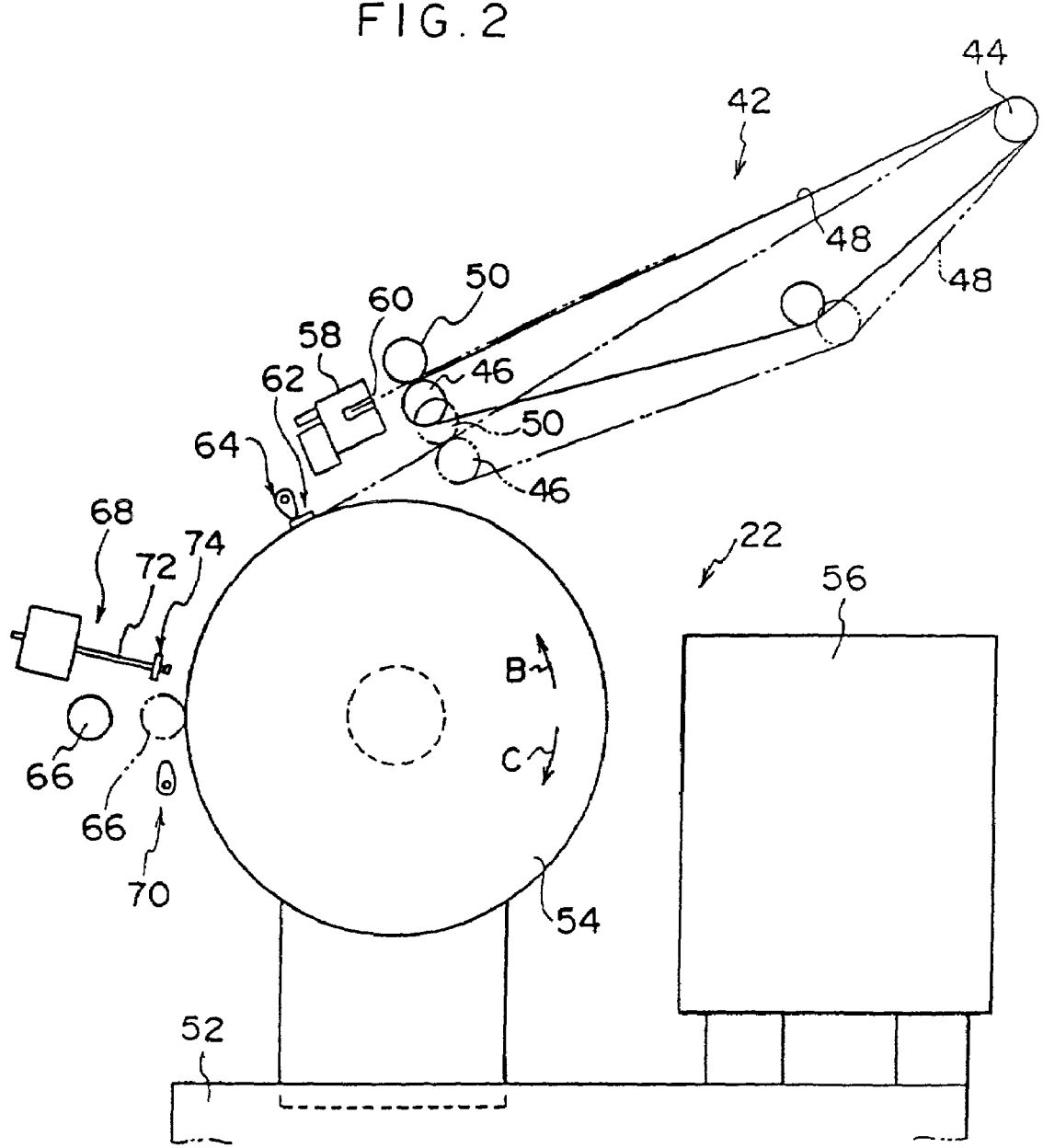
FIG. 2 is a general view showing a schematic structure of a recording section of the image exposure apparatus.

As shown in FIGS. 1 and 2, a roller 50 is disposed opposite the roller 46 in the conveyer 42. The printing plate 12 sent on the conveyer 42 is conveyed on the conveyor belt 48 and nipped by the rollers 46 and 50. In the recording section 22, a rotary drum 54 and a recording head 56 are mounted on a base 52. A puncher 58 is disposed above the rotary drum 54.

As shown in FIG. 2, the puncher 58 is disposed with an opening 60. When the conveyer 42 inserts the leading edge of the printing plate 12 into the opening 60 and the printing plate 12 is held by the rollers 46 and 50, the puncher 58 creates a positioning notch at a predetermined position in the leading edge of the printing plate 12.

When the notch has been formed in the printing plate 12, the conveyer 42 drives the rollers 46 and 50 in reverse together with the conveyor belt 48, and pulls out the leading edge of the printing plate 12 from the opening 60. The conveyer 42 is disposed with swinging means (not illustrated). Using the roller 44 as a pivot, the swinging means swings the conveyer 42 downward so that the roller 46 approaches the rotary drum 54 (this swinging motion is shown by two-dotted chain lines in FIGS. 1 and 2). Accordingly, the printing plate 12 is conveyed along the conveyor belt 48 toward the rotary drum 54, with the leading edge of the printing plate 12 being directed toward a predetermined position on the peripheral surface of the rotary drum 54.

The rotary drum 54 is rotated by driving means (not illustrated) in the direction in which the printing plate 12 is attached to the rotary drum 54 and exposed (i.e., the direction of arrow B in FIGS. 1 and 2) and in the direction in which the printing plate 12 is detached from the rotary drum 54 (i.e., the direction of arrow C in FIGS. 1 and 2).

As shown in FIG. 2, a leading edge chuck 62 is attached at a predetermined position on the peripheral surface of the rotary drum 54. When the printing plate 12 is attached to the rotary drum 54, the rotary drum 54 is first stopped so that the leading edge chuck 62 is positioned opposite to the leading edge of the printing plate 12 (printing plate attachment position) conveyed by the conveyer 42.

The recording section 22 is disposed with an attachment cam 64 opposite to the leading edge chuck 62 at the printing plate attachment position. The attachment cam 64 is swung to press one end of the leading edge chuck 62, whereby the printing plate 12 can be inserted between the other end of the leading edge chuck 62 and the peripheral surface of the rotary drum 54. When the printing plate 12 has been inserted in this manner, the attachment cam 64 is returned to its original position so that the end of the leading edge chuck 62 is no longer pressed, and the leading edge of the printing plate 12 is nipped by and held between the leading edge chuck 62 and the peripheral surface of the rotary drum 54. At this time, a positioning pin (not illustrated) that protrudes from a predetermined position on the peripheral surface of the rotary drum 54 enters the notch formed by the puncher 58, to thereby position the printing plate 12 on the rotary drum 54.

When the leading edge of the printing plate 12 has been fixed to the rotary drum 54, the rotary drum 54 is rotated in the direction of arrow B shown in FIGS. 1 and 2, and the printing plate 12 is wound around the peripheral surface of the rotary drum 54.

The size (length) of the printing plates 12 that may be used in the present embodiment can be generally classified into the following four types.

TABLE 1

| TYPE | LENGTH (IN THE DIRECTION IN WHICH THE PRINTING PLATE IS WOUND AROUND THE ROTARY DRUM) (mm) |
|---|---|
| #1 | 550~600 |
| #2 | 650~700 |
| #3 | 750~800 |
| #4 | 900~950 |

A squeeze roller 66 is disposed near the peripheral surface of the rotary drum 54 and downstream from the position at which the printing plate 12 is attached to the rotary drum 54. The squeeze roller 66 is moved toward the rotary drum 54, to thereby press and closely adhere the printing plate 12 to the peripheral surface of the rotary drum 54.

A trailing edge chuck attachment/detachment unit 68 is disposed near the rotary drum 54 and upstream from the squeeze roller 66, and a detachment cam 70 is disposed downstream from the squeeze roller 66. The trailing edge chuck attachment/detachment unit 68 includes a shaft 72, which projects toward the rotary drum 54 and has a tip at which a trailing edge chuck 74 is disposed.

When the trailing edge of the printing plate 12 wound around the rotary drum 54 opposes the trailing edge chuck attachment/detachment unit 68, the shaft 72 is moved towards the rotary drum 54 to attach the trailing edge chuck 74 at a predetermined position on the rotary drum 54. The trailing edge of the printing plate 12 is thereby nipped between the trailing edge chuck 74 and the rotary drum 54 and held.

When the leading and trailing edges of the printing plate 12 are held at the rotary drum 54, the squeeze roller 66 is moved away from the rotary drum 54. Thereafter, while the rotary drum 54 is rotated at a predetermined high speed, a light beam modulated on the basis of image data is emitted from the recording head 56 synchronously with the rotation of the rotary drum 54. The printing plate 12 is thereby scan-exposed on the basis of the image data.

After scan-exposure of the printing plate 12 is completed, when the trailing edge chuck 74 holding the trailing edge of the printing plate 12 is positioned opposite the trailing edge chuck attachment/detachment unit 68, the rotary drum 54 stops rotating. The squeeze roller 66 moves toward the rotary drum 54 and presses the printing plate 12 against the rotary drum 54. The trailing edge chuck attachment/detachment unit 68 receives the trailing edge chuck 74 and pulls the trailing edge chuck 74 away from the rotary drum 54. As a result, the trailing edge of the printing plate 12 is released.

After the trailing edge chuck 74 has been detached from the rotary drum 54, the rotary drum 54 rotates in the direction of arrow C shown in FIGS. 1 and 2, whereby the printing plate 12 is sent out from between the squeeze roller 66 and the rotary drum 54.

As shown in FIG. 1, the discharge buffer section 24 is disposed above the squeeze roller 66. The rotary drum 54 rotates in the direction of arrow C to send the trailing edge of the printing plate 12 toward the discharge buffer section 24. The rotary drum 54 stops at the position at which the printing plate is detached (i.e., where the leading edge chuck 62 opposes the detachment cam 70). By swinging the detachment cam 70 at this position, the leading edge chuck 62 is pressed, whereby the leading edge of the printing plate 12 is no longer nipped between the leading edge chuck 62 and the rotary drum 54. As a result, the printing plate 12 is detached from the rotary drum 54.

The discharge buffer section 24 includes an ejection roller 78 disposed on the inner side of an exhaust port 76 formed in the machine casing 14. A plurality of small rollers (e.g., small rollers 80A, 80B, 80C, 80D and 80E) is disposed around the ejection roller 78 and an endless conveyor belt 82 is entrained around the small rollers 80A to 80E. The conveyor belt 82 is thus entrained around the small rollers 80A through 80E in a range of between about ½ to about ¾ the circumference of the discharge roller 78.

The small roller 80A projects toward the squeeze roller 66 in the recording section 22, and an idle roller 84 is disposed to oppose the small roller 80A. The printing plate 12 sent out from the recording section 22 is guided to between the small roller 80A and the idle roller 84 and is nipped thereby.

By rotating the ejection roller 78 in the direction in which the printing plate 12 is pulled out (ie., the direction of arrow D in FIG. 1), the printing plate 12 nipped between the small roller 80A and the idle roller 84 is pulled out from the recording section 22, guided to between the ejection roller 78 and the conveyor belt 82, nipped by the same, and thereby wound around the ejection roller 78. By nipping the leading edge (i.e., the trailing edge when the printing plate 12 is sent out from the recording section 22) of the printing plate 12 between the small roller 80A and the idle roller 84, the printing plate 12 wound around the ejection roller 78 is temporarily held.

As shown by two-dotted chain lines in FIG. 1, in the discharge buffer section 24, the small roller 80A and the idle roller 84 move to a position where they oppose the discharge opening 76. The small roller 80A and the idle roller 84 rotate integrally, thereby directing the leading edge of the printing plate 12 to the discharge opening 76. The small roller 80B above the small roller 80A moves in accompaniment with the movement of the small roller 80A to impart a predetermined tension to the conveyor belt 82.

When the leading edge of the printing plate 12 is directed to the discharge opening 76, the ejection roller 78 is rotated in the direction that the printing plate 12 is fed out (i.e., the direction opposite to the direction of arrow D) at a rotational speed that corresponds to the speed at which the printing plate 12 is conveyed at processing apparatuses, such as an automatic developing apparatus, disposed adjacent to the discharge opening 76. In this manner, the printing plate 12 is sent out from the discharge opening 76.

As described above, the leading edge chuck 62 for fixing the leading edge of the printing plate 12 at the predetermined position on the peripheral surface of the rotary drum 54 is fixedly secured to the rotary drum 54 when the printing plate is wound around the rotary drum 54. The trailing edge chuck 74 for fixing the trailing edge of the printing plate 12 is mounted to the rotary drum 54.

Figure 3:
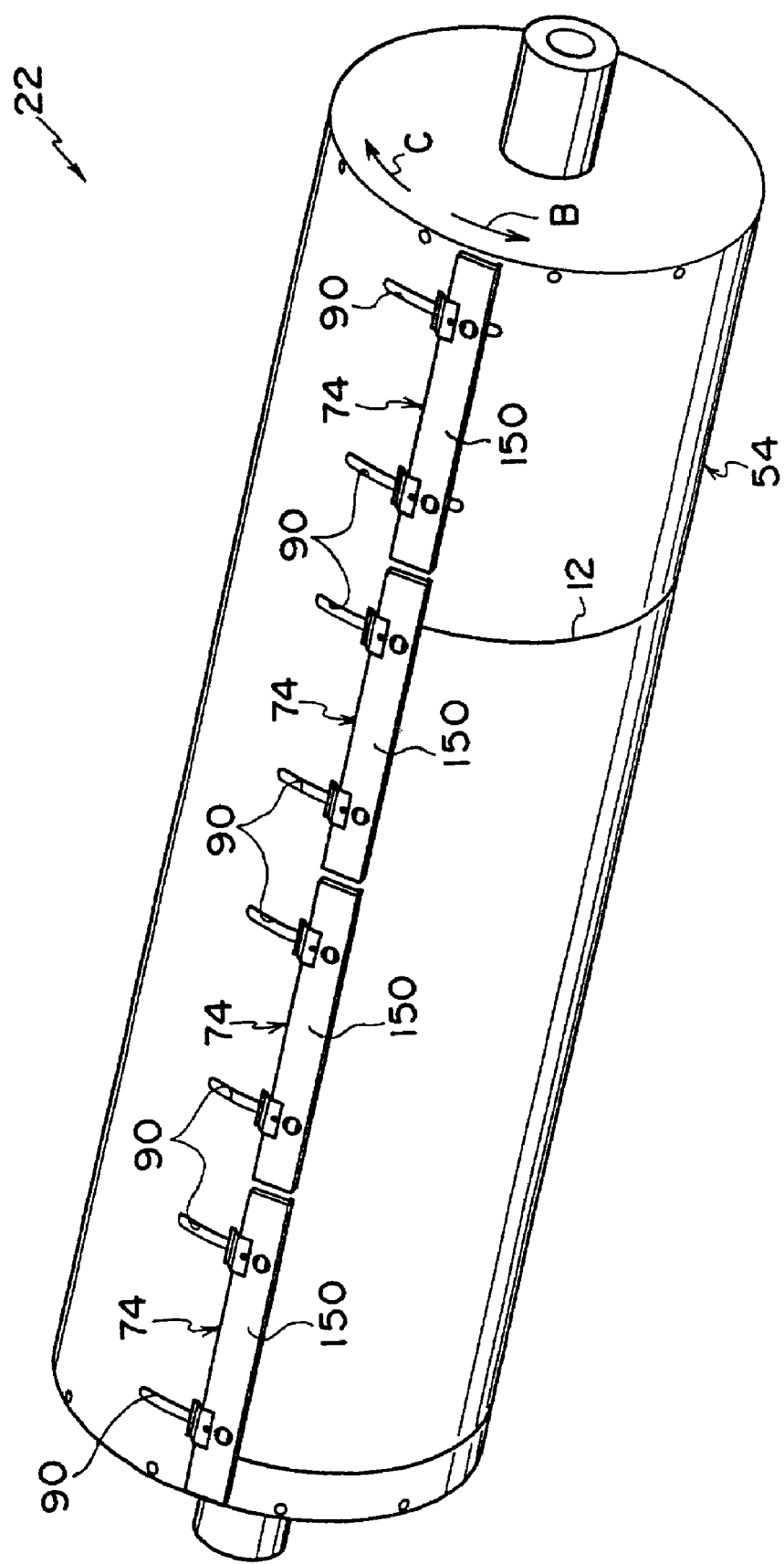
FIG. 3 is a view showing disposal of leading edge chucks and trailing edge chucks with respect to a rotary drum.

As shown in FIG. 3, the leading edge chuck 62 is disposed with elongated plates 150 of a predetermined length. The plates 150 are arranged along an axial direction of the rotary drum 54 at predetermined intervals. Similarly, the trailing edge chuck 74 is disposed with elongated plates 150 of a predetermined length, and these plates 150 are also arranged on and mounted to the peripheral surface of the rotary drum 54 at predetermined intervals.

The leading edge chuck 62 and the trailing edge chuck 74 have approximately the same structure, but respective orientations of the plates 150 are different. In the present embodiment, the leading edge chuck 62 is always fixedly secured to the rotary drum 54, whereas the trailing edge chuck 74 is attachable to and detachable from the rotary drum 54.

Figure 4:
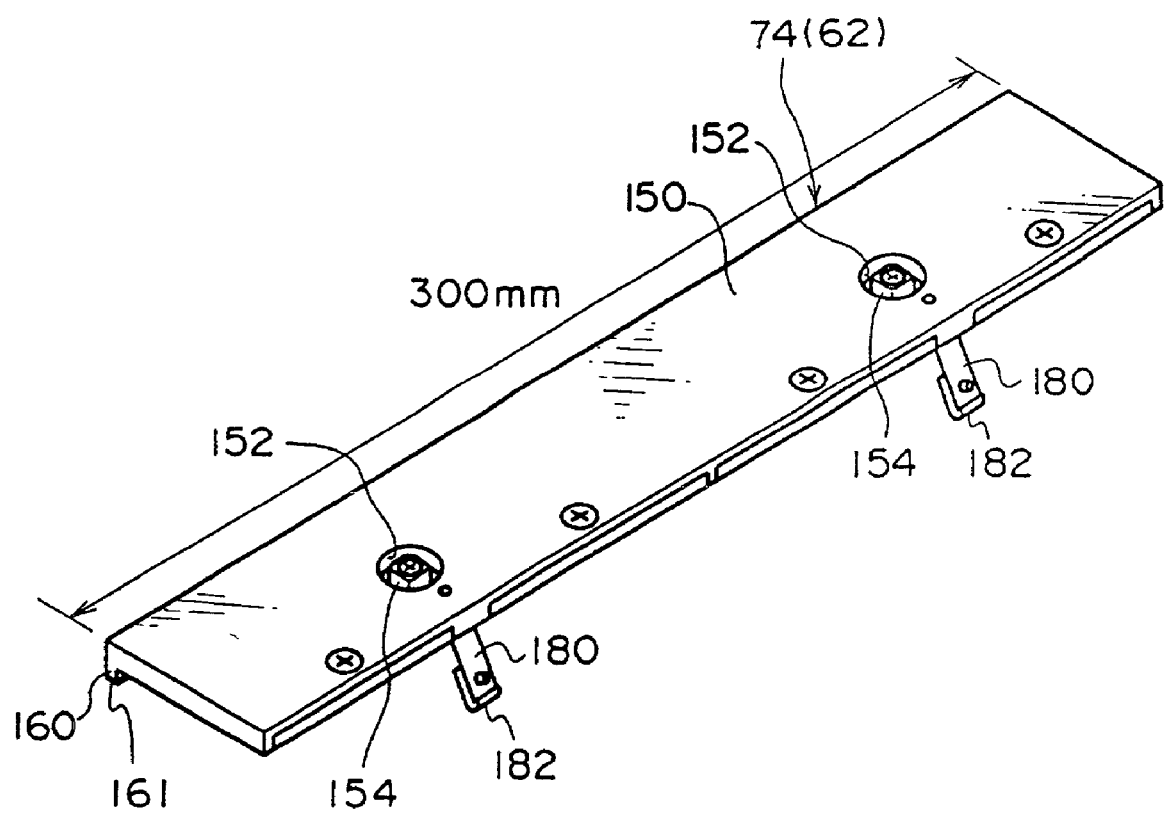
FIG. 4 is a perspective view showing a chuck according to the embodiment, as seen from outside.
Figure 5:
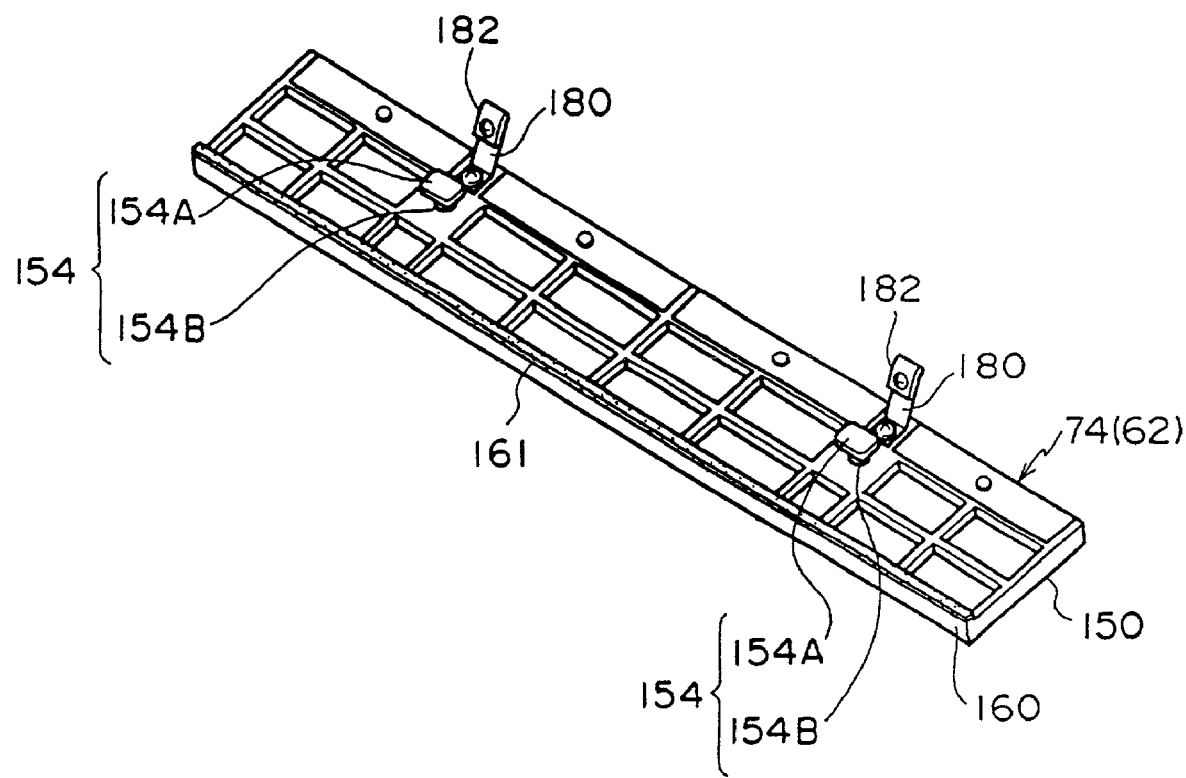
FIG. 5 is a perspective view showing the chuck according to the embodiment, as seen from inside.
Figure 6:
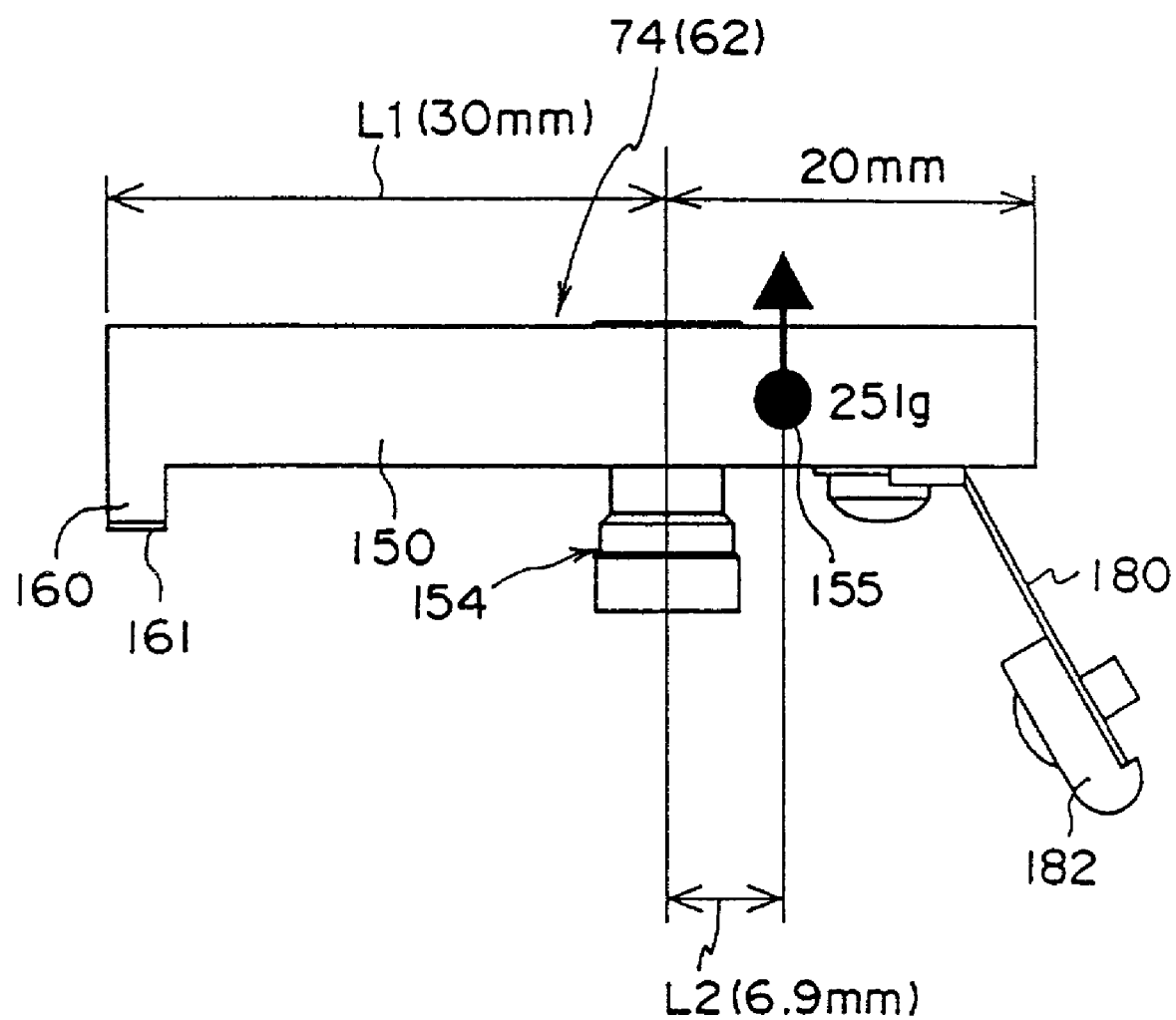
FIG. 6 is a side view showing the chuck according to the embodiment.

With reference to FIGS. 4 through 6, the structures of the leading edge chuck 62 and the trailing edge chuck 74 will be now described.

The plate 150 of the trailing edge chuck 74 is disposed with a through-hole 152 formed at two predetermined locations along the lengthwise direction (of the plate 150), with each through-hole 152 being substantially centered in the widthwise direction (of the plate 150). The plate 150 has two supports 154, each of which is inserted into the corresponding through-hole 152. Each of the supports 154 comprises a rectangular, block-like base section 154A and a pillar-shaped supporting section 154B disposed on an upper surface of the base section 154A.

Figure 7:
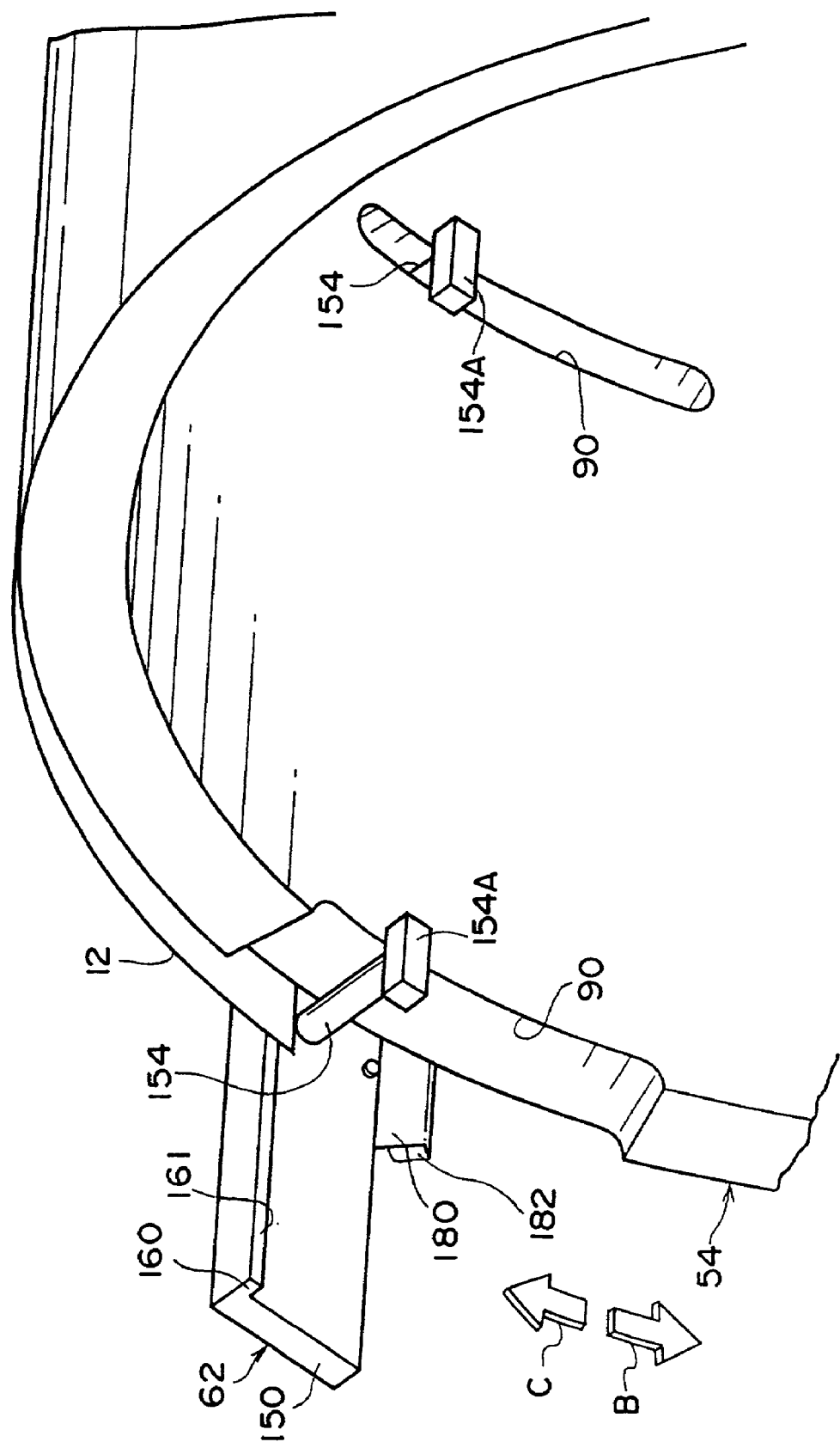
FIG. 7 is a partial perspective view showing the inside of the rotary drum.

As shown in FIGS. 3, 7, and 8, elongated through-slots 90 are formed in the peripheral surface of the rotary drum 54. The through-slots 90 are arranged along imaginary lines K (two-dotted chain lines in FIG. 8) with a fixed, regular interval being disposed each adjacent imaginary line K. The through-slots 90 are disposed along each line K according to the following rule. The trailing edge chuck 74 is attached to the rotary drum 54 in such a manner that the base sections 154A of the supports 154 are inserted through the through-slots 90, whereby the supports 154 are pivotable, in a direction orthogonal to the axial direction of the rotary drum 54, about a point of contact between the through-slot 90 and the support 154.

The widthwise and lengthwise dimensions of the through-slots 90 are determined in accordance with the supports 154. The supports 154 are effectively movable in and along the through-slots 90 by a distance M (e.g., approximately 50 mm) as seen in FIG. 9.

Figure 8A:
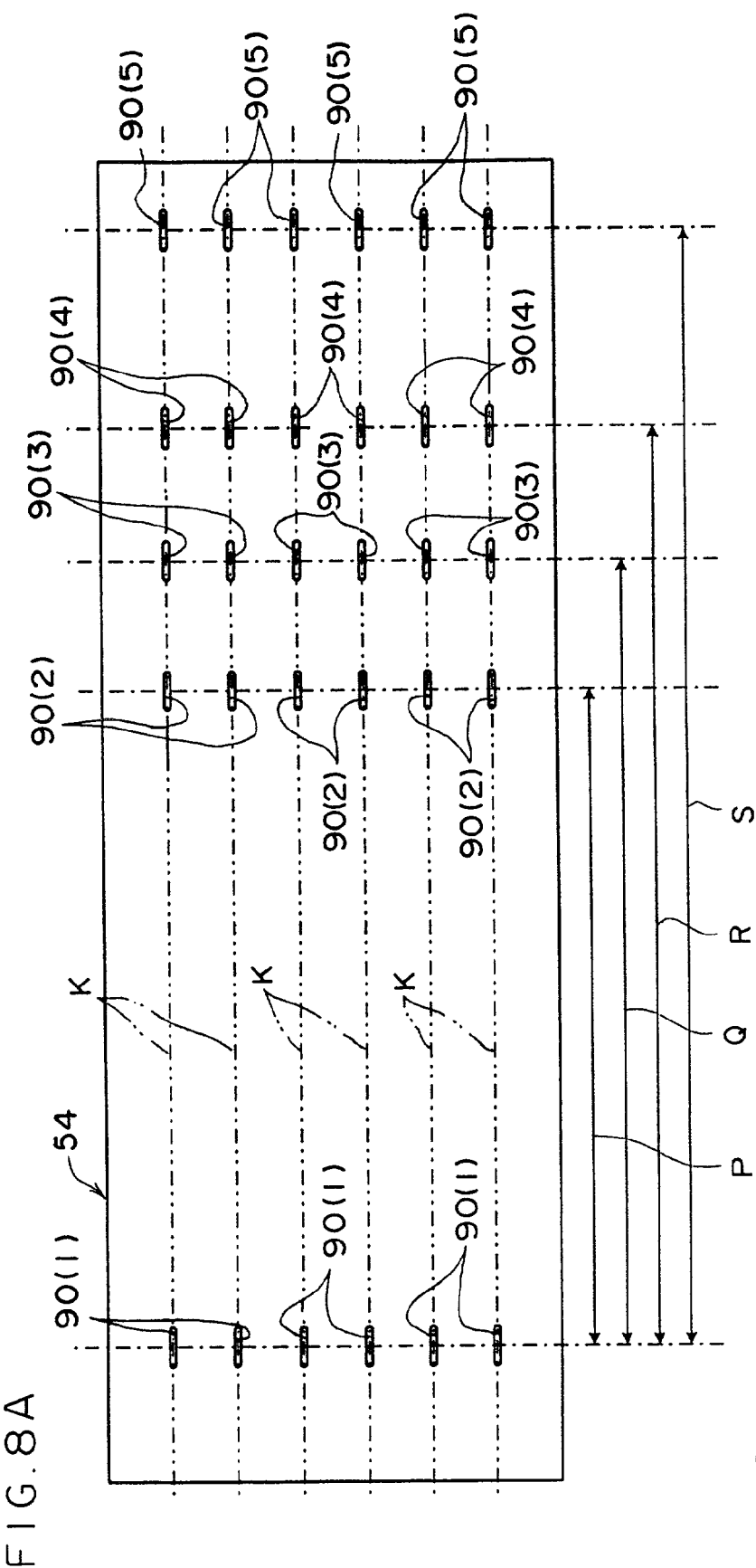
FIG. 8A is an exploded view of the rotary drum.
Figure 8B:
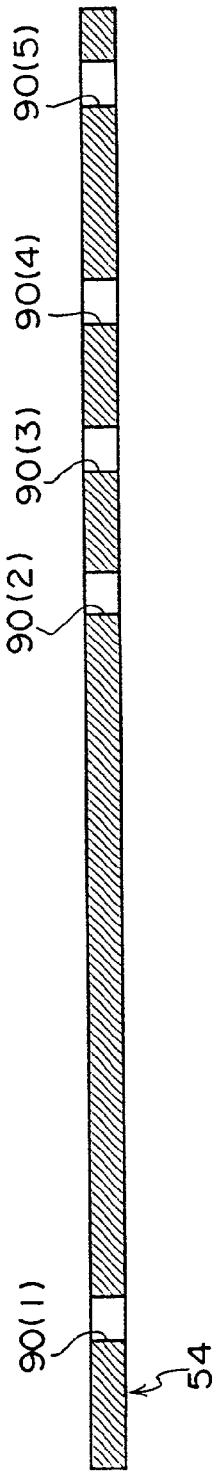
FIG. 8B is a side cross-sectional view showing the rotary drum of FIG. 8A.

FIG. 8A is a schematic illustration of the rotary drum 54 developed on a flat surface for best illustrating the through-slots 90 in the peripheral surface of the rotary drum 54. FIG. 8B is a longitudinal section taken along the line K of FIG. 8A.

As shown in FIG. 8A, a distance between the center of the through-slot 90(1) for fixing the leading edge chuck 62 (the center being the cardinal or base point of measurement) and the center of one of the through-slots 90(2), 90(3), 90(4), and 90(5) is set as follows.

TABLE 2

| POSITIONAL DISTANCE | ACTUAL SIZE (mm) | CORRESPONDING TYPE OF PRINTING PLATE |
| --- | --- | --- |
| P = 90 (1) to 90 (2) | 575 | #1 |
| Q = 90 (1) to 90 (3) | 675 | #2 |
| R = 90 (1) to 90 (4) | 775 | #3 |
| S = 90 (1) to 90 (5) | 925 | #4 |

When the support 154 is inserted into the through-slot 90 formed in the rotary drum 54, a narrow side of the support 154 corresponds to a widthwise direction of the through-slot 90, so that it is possible to insert the narrow side of the support 154 into the through-slot 90. Once inserted, the support 154 is rotated approximately 90°, whereby the base section 154A engages with (abuts against) an inner peripheral surface of the rotary drum 54 so as to be prevented from slipping out.

It should be noted that it is not necessary for the leading edge chuck 62 to have the same structure as the trailing edge chuck 74. For example, the leading edge chuck 62 may be fixed by bolts.

In a state in which all constituent members of the plate 150 have been assembled, the center of gravity (shown as a solid black circle 155 in FIG. 6) of the plate 150 lies to the right of the axis of the support 154 in FIG. 6. The numerical values in the same figure for weight and dimensions of the trailing edge chuck 74 (the leading edge chuck 62) are given only as an example.

A clamp 160 is formed at one end (the left end in FIG. 6) in a widthwise direction of the plate 150 of the trailing edge chuck 74. The clamp 160 extends at a substantial right angle from the plate 150 toward the rotary drum 54, and a rubber sheet 161 is stuck to a distal end surface of the clamp 160. The rubber sheet 161 directly contacts the printing plate 12 and is an important element for determining coefficient of friction when the printing plate 12 is nipped by the clamp 160 to the peripheral surface of the rotary drum 54.

One end of a plate spring 180 bent in a substantial L shape is fixed to the under surface of the right end (in FIG. 4) of the plate 150. The direction in which the plate spring 180 is bent approaches the rotary drum 54 and an anchor 182 is attached to the other end of the plate spring 180. A surface at the distal-most end of the anchor 182 is substantially arc-shaped.

When the weight 182 with the plate spring 180 is attached to the rotary drum 54, the weight 182 contacts the peripheral surface of the rotary drum 54 (at peripheral edges of the through-slot 90). Specifically, when the trailing edge chuck 74 approaches the rotary drum 54, the weight 182 first abuts the peripheral surface of the rotary drum 54. As the trailing edge chuck 74 further approaches the rotary drum 54, the plate spring 180 is elastically (resiliently) deformed and the base section 154A of the support 154 is inserted into the through-slot 90. After the base section 154A has passed through the through-slot 90, the support 154 is rotated approximately 90° in order for the base section 154A to engage with the inner peripheral surface of the rotary drum 54 to prevent the support from slipping out from the through-slot 90. An urging force generated by the elastic deformation of the plate spring 180 causes the plate 150 to pivot on the support 154. As a result, a pressing force at the clamp 160 is generated.

Description will now be given of the operation of the present embodiment.

In the image exposure apparatus 10, image data to be exposed on the printing plate 12 is inputted, and the size and the number of printing plates 12 on which an image is to be formed by exposure are set. When a command to initiate image exposure is given, image exposure processing of the printing plate 12 begins. The command may be given by disposing an operation panel on the image exposure apparatus 10 and operating switches on the operation panel, or by a signal from an image processor or the equivalent for outputting image data to the image exposure apparatus 10.

When the command to initiate processing is given, the sheet feeding unit 30 is moved together with the reversal unit 28 to a position corresponding to the cassette 16 housing the printing plate 12 of the designated size. The printing plate 12 in the corresponding cassette 16 is then sucked and extracted by the suction cup 38 and sent to between the reverse roller 32 of the reversal unit 28 and the conveyor belt 36. The printing plate 12 is nipped between and carried by the reverse roller 32 and the conveyor belt 36, and sent to the conveyer 42.

In the conveyer 42, the leading edge of the printing plate 12 is first inserted into the insertion opening 60 of the puncher 58. The puncher 58 punches a positioning notch at a predetermined position in the printing plate 12. After the notch has been formed in the printing plate 12, the conveyer 42 pulls the printing plate 12 out from the insertion opening 60 of the puncher 58, and the printing plate 12 is sent along a direction tangential to the rotary drum 54 toward the peripheral surface of the rotary drum 54.

When the leading edge of the printing plate 12 is held on the rotary drum 54 by the leading edge chuck 62, the printing plate 12 is wound around the rotary drum 54 while being squeezed by the squeeze roller 66. Subsequently, the trailing edge of the printing plate 12 is held on the rotary drum 54 by the trailing edge chuck 74.

Thereafter, in the recording section 22, while the rotary drum 54 is being rotated at high speed, the light beam based on the image data is emitted from the recording head section 56 to the printing plate 12 to scan-expose the printing plate 12. While the rotary drum 54 is rotated at high speed, the force by which the printing plate 12 is nipped by the leading edge chuck 62 and the trailing edge chuck 74 and the force by which the printing plate 12 is tensioned (stretched; to prevent the printing plate 12 from coming off of the rotary drum 54) are enhanced by the action of the centrifugal force of the rotary drum 54.

After scan-exposure of the printing plate 12 is completed, the trailing edge chuck 74 is detached (separated from) the rotary drum and the printing plate 12 is sent to the discharge buffer section 24.

In the discharge buffer unit 24, the printing plate 12 is nipped between and conveyed by the small roller 80A and the idle roller 84 so as to be wound around the discharge roller 78. Thereafter, the small roller 80A and the idle roller 84 are moved opposite to the discharge opening 76 and the printing plate 12 is sent from the discharge opening 76 at a predetermined conveying speed.

The nipping, tensioning, and holding of the printing plate 12 on the rotary drum 54 by the leading edge chuck 62 and the trailing edge chuck 74 will now be described in detail. Firstly, when the trailing edge chuck 74 is mounted on the rotary drum 54, short sides of the base section 154A of the support 154 are oriented so as to correspond to an opening widthwise direction of the through-slot 90. Then, the base section 154A is smoothly inserted into the through-slot 90 until it passes therethrough. Thereafter, the whole support 154 is rotated approximately 90°, whereby the long sides of the base section 154A are set along the opening widthwise direction of the through-slot 90 such that they engage with (abut against) the inner peripheral surface of the rotary drum 54, to thereby prevent the support 154 from slipping out of the through-slot 90.

In order to detach the trailing edge chuck 74 from the rotary drum 54, the base section 154A can be rotated roughly another 90° and pulled out.

When the ends of the printing plate 12 come between the cylindrical body 210 of the guiding member 204 and the plate 150, the cam 64 is released so that the urging force of the plate spring 180 causes the plate 150 to pivot around the support 154. Because the clamp 160 is moved toward the peripheral surface of the rotary drum 54 by this pivoting, the printing plate 12 is nipped between the clamp 160 and the peripheral surface of the rotary drum 54.

When the printing plate 12 reaches the predetermined position, the trailing edge chuck 74 is attached to the rotary drum 54. Consequently, the urging force of the plate spring 180 works in accompaniment with the movement for attaching the trailing edge chuck 74 (the weight 182 at the distal end of the plate spring 180 firstly reaches the periphery of the through-slot 90), the plate 150 is gradually swung by using the support 154 as a fulcrum, and the positioned printing plate 12 is nipped between the trailing edge chuck 74 and the peripheral surface of the rotary drum 54.

Once the printing plate 12 is held by the leading edge chuck 62 and the trailing edge chuck 74, the rotary drum 54 starts to rotate at high speed in order to record an image.

As a result of this rotation, the plate 150 is pivoted on the support 154 by centrifugal force. Since the center of gravity of the plate 150 is on the side opposite to the clamp 160, with the support 154 being situated therebetween, the centrifugal force acts on the center of gravity of the plate 150 in the same direction as that of the urging force of the plate spring 180. Therefore, the force by which the printing plate 12 is nipped is increased when the rotary drum 54 rotates at high speed (i.e., during image recording).

In this respect, for the centrifugal force due to the high-speed rotation of the rotary drum 54, the distance $L_1$ from the support 154 of the leading edge chuck 62 or trailing edge chuck 74 to the clamp 160, the distance $L_2$ from the support 154 to the center of gravity 155, and the position of the center of gravity 155 are important factors.

In the present embodiment, the rotary drum 54 comprises a hollow, cylindrical body having an inner peripheral surface in which a plurality of through-slots is formed. When the leading edge chuck 62 and the trailing edge chuck 74 are secured onto the rotary drum 54, their supports 154 can be held by the inner peripheral surface of the rotary drum 54. Namely, there is no need to provide a substantially inverted T-shaped groove that is typically used to prevent the chucks from slipping off or coming out of the rotary drum 54.

In the present embodiment, printing plates having a high frequency of use are pre-classified by size (see Table 1). A pitch distance (P,Q,R,S) from the through-slot 90(1) to one of the through-slots 90(2), 90(3), 90(4), and 90(5) is set such that it may correspond to one of the types of the printing plates (see Table 2). Therefore, printing plates of virtually any size can be used.

As described above, because the through-slots 90 for fixing the leading edge chuck 62 and trailing edge chuck 74 are disposed at the rotary drum 54, the radial (wall) thickness of the rotary drum can be reduced in comparison with a case where inverted T-shaped grooves are formed in the rotary drum. Thus, a smaller and lighter rotary drum 54, in which rotational load at the time the rotary drum 54 is rotated can be reduced and the rotary drum 54 can be rotated more stably at high speed, is achieved.

What is claimed is:

1. A fixing structure for detachably fixing a sheet member, comprising:
   a rotor having an outer peripheral surface, around which the sheet member is wound, and an inner peripheral surface portion, the rotor including a plurality of through-slots formed in the outer peripheral surface of the rotor at predetermined intervals in the peripheral direction, with each of the through-slots being elongated in the peripheral direction and communicating the outer peripheral surface with the inner peripheral surface portion; and
   a chuck detachably mountable to the rotor, for clamping one end of the sheet member onto the rotor, the chuck including a support having opposite ends, with a clamp plate being disposed at one end of the support and a base section being disposed at the other end of the support, wherein when the chuck is mounted on the rotor, the base section is inserted and passed through one associated through-slot and then hooked over the inner peripheral surface portion.

2. The fixing structure of claim 1, wherein the rotor comprises a hollow cylindrical body.

3. The fixing structure of claim 1, wherein the support is rotatable with the base section about an axis of the support, and the base section is structured such that, when the base section is positioned at a first rotation angle position around the axis of the support, the base section can be inserted and passed through one through-slot, and when the base section is rotated from the first rotation angle position to a second rotation angle position, the base section engages with the inner peripheral surface portion to thereby prevent the base section from being removed.

4. The fixing structure of claim 1, wherein the clamp plate is pivotable about one end of the support.

5. The fixing structure of claim 1, wherein the clamp plate has two ends and is supported by the support between said two ends.

6. The fixing structure of claim 1, wherein the support is mountable to the rotor at a plurality of positions along respective through-slots, such that the sheet member may be fixed to the rotor at any position along the peripheral direction of the rotor.

7. The fixing structure of claim 1, wherein the rotor is for fixing a printing plate when the printing plate is scan-exposed.

8. The fixing structure of claim 1, further comprising a different chuck for clamping another end of the sheet member onto the rotor.

9. The fixing structure of claim 8, wherein said different chuck is ordinarily fixed to the rotor.

10. The fixing structure of claim 8, wherein said different chuck is detachably mounted to the rotor through one of the through-slots.

11. An apparatus for forming an image on a printing plate, comprising:
    a rotary drum having an outer peripheral surface, around which the printing plate is wound, and an inner peripheral surface portion, the rotary drum including a plurality of through-slots formed in the outer peripheral surface of the rotary drum at predetermined intervals in the peripheral direction, with each of the through-slots being elongated in the peripheral direction and communicating the outer peripheral surface with the inner peripheral surface portion;
    a chuck detachably mountable to the rotary drum, for clamping one end of the printing plate onto the rotary drum, the chuck including a support having opposite ends, with a clamp plate being disposed at one end of the support and a base section being disposed at the other end of the support, wherein when the chuck is mounted on the rotary drum, the base section is inserted and passed through one associated through-slot and then hooked over the inner peripheral surface portion; and
    a recording head disposed for recording an image on the printing plate wound on the rotary drum.

12. The apparatus of claim 11, wherein the rotary drum comprises a hollow cylindrical body.

13. The apparatus of claim 11, wherein the support is rotatable with the base section about an axis of the support, and the base section is structured such that, when the base section is positioned at a first rotation angle position around the axis of the support, the base section can be inserted and passed through one through-slot, and when the base section is rotated from the first rotation angle position to a second rotation angle position, the base section engages with the inner peripheral surface portion to thereby prevent the base section from being removed.

14. The apparatus of claim 11, wherein the clamp plate is pivotable about one end of the support.

15. The apparatus of claim 11, wherein the clamp plate has two ends and is supported by the support between said two ends.

16. The apparatus of claim 11, wherein the support is mountable to the rotary drum at a plurality of positions along respective through-slots, such that the sheet member may be fixed to the rotary drum at any position along the peripheral direction of the rotary drum.

17. The apparatus of claim 11, further comprising a drive unit for driving the rotary drum.

18. The apparatus of claim 11, further comprising a different chuck for clamping another end of the printing plate onto the rotary drum.

19. The apparatus of claim 18, wherein said different chuck is ordinarily fixed to the rotary drum.

20. The apparatus of claim 18, wherein said different chuck is detachably mounted to the rotary drum through one of the through-slots.

* * * * *